United States Patent
Bui et al.

(10) Patent No.: US 7,177,114 B1
(45) Date of Patent: Feb. 13, 2007

(54) APPARATUS, SYSTEM, AND METHOD FOR THE VELOCITY PROPORTIONAL CLOCKING OF TIME BASE SERVO TAPE STORAGE DEVICES

(75) Inventors: Nhan Xuan Bui, Tucson, AZ (US); Robert Allen Hutchins, Tucson, AZ (US); Eiji Ogura, Yokohama (JP); Mark Allan Taylor, Tucson, AZ (US); Kazuhiro Tsuruta, Sagamihara (JP)

(73) Assignee: International Bussiness Machines Corporation, Armonk, NY (US)

( * ) Notice: Subject to any disclaimer, the term of this patent is extended or adjusted under 35 U.S.C. 154(b) by 0 days.

(21) Appl. No.: 11/225,930

(22) Filed: Sep. 13, 2005

(51) Int. Cl.
*G11B 5/584* (2006.01)
*G11B 15/46* (2006.01)

(52) U.S. Cl. .............................. 360/77.12; 360/77.13; 360/73.04

(58) Field of Classification Search ..................... None
See application file for complete search history.

(56) References Cited

U.S. PATENT DOCUMENTS 6,122,124 A * 9/2000 Fasen et al. .................. 360/51

\* cited by examiner

*Primary Examiner*—Andrew L. Sniezek
(74) *Attorney, Agent, or Firm*—Kunzler & Associates

(57) ABSTRACT

An apparatus, system, and method are disclosed for the velocity proportional clocking of time base servo tape storage devices. The apparatus, system, and method allow the velocity of time base servo tape storage devices to be adjusted and maintained by adjusting the frequency of a clock. In one embodiment, a velocity command is received and the clock signal frequency is varied in response to the command. A feedback control signal may then be produced to control the velocity of a time base servo device in response to the clock signal frequency, the feedback control signal being used to vary the velocity of a servo motor. In one embodiment, the velocity of the servo motor varies directly proportionate to the clock signal frequency.

20 Claims, 6 Drawing Sheets

APPARATUS, SYSTEM, AND METHOD FOR THE VELOCITY PROPORTIONAL CLOCKING OF TIME BASE SERVO TAPE STORAGE DEVICES

BACKGROUND OF THE INVENTION

1. Field of the Invention

This invention relates to time base servo tape storage devices and more particularly relates to the use of velocity proportional clocking to correct tape drive track following problems with regard to head position.

2. Description of the Related Art

Modern technological trends have led to the heavy reliance of businesses on electrical and magnetic data storage devices. In particular, magnetic tape storage devices have become popular for their low cost and high data capacities. As a result, demand has also increased for tape storage devices with improved reliability, speed, and bit density. With regard to linear tape devices, there have been significant increases in recording density (meaning there is more information stored on a given length of tape) as well as track density (meaning there are more data tracks stored across the width of the tape). The continued increase in density, however, has led to the need for more accurate servo control systems that allow for more precise track following.

In order to implement more precise track following, many entities are now using time base servos that utilize a measurement of the time between servo stripe signal peaks to correct the head position. One side effect of this is that noise caused by tape signal dropout due to media defects may corrupt the signal resulting in a misplaced head position. Some of these defects have been overcome by implementing a combination of Hipass, Lowpass, and Bandpass filters which are usually realized digitally as IIR (Infinite Impulse Response) or FIR (Finite Impulse Response) filters. Because tape drives are usually required to operate at many different velocities, different filter coefficients must be designed for each desired velocity. This can result in high design and implementation costs.

In one embodiment, an Analog-to-Digital Converter (ADC) is used to sample the signal stored on the magnetic tape. Current technology uses the same sampling rate regardless of the tape velocity, meaning there are a different number of samples per cycle for each different velocity. This can result in high costs because separate difference equalizer settings must be designed for each of the different operating velocities. By using velocity proportional clocking, one equalizer setting can be used for all velocities.

Another problem with current time base servo designs relates to the peak time measurement methods used to produce the corrective feedback signal. In one embodiment, a high frequency clock is used to count the time, or clock cycles, that occur between uniform signal peaks formatted on the magnetic tape. As the tape velocity fluctuates from one operating velocity to another, the count can become very large at slower velocities (resulting in overflow) or very small at higher velocities (resulting in a lack of resolution). Errors caused by overflow or a lack of resolution can lead to inaccurate head positions and costly inefficiencies. By varying the clock frequency proportional to the tape velocity, the steady state counter value can be fixed using a reference value, thereby reducing the possibility of counter errors.

From the foregoing discussion, it should be apparent that a need exists for an apparatus, system, and method for the velocity proportional clocking of time base servo tape storage devices. Beneficially, such an apparatus, system, and method would reduce production costs by eliminating resolution and overflow problems, eliminating the need for multiple filter designs corresponding to each operating velocity, and eliminating the need for multiple difference equalizer designs.

SUMMARY OF THE INVENTION

The present invention has been developed in response to the present state of the art, and in particular, in response to the problems and needs in the art that have not yet been fully solved by currently available time base servo controllers. Accordingly, the present invention has been developed to provide an apparatus, system, and method for the proportional clocking of time base servo tape storage devices that overcome many or all of the above-discussed shortcomings in the art.

The apparatus is provided with a plurality of modules configured to functionally execute the necessary steps for the velocity proportional clocking of time base servo tape storage devices. These modules in the described embodiments include: a clock varying module configured to receive a velocity command and vary a clock signal frequency in response to the velocity command; a signal processing module configured to produce a feedback control signal to control the velocity of a time base servo device in response to the clock signal frequency; and a mechanical control module configured to vary the velocity of a servo motor in response to the feedback control signal.

The apparatus, in one embodiment, may produce a feedback signal that will cause a servo motor to operate at a velocity directly proportional to the clock signal frequency. In a further embodiment, the apparatus detects the current operating velocity and produces the feedback control signal in response to the current operating velocity and the current clock signal frequency, thereby allowing the apparatus to make velocity corrections until a steady state is reached. The apparatus may be used to actuate a time base linear tape device, helical tape storage device, or other storage device as will be recognized by one skilled in the art.

The apparatus may, in one embodiment, utilize a PLL (Phase Locked Loop) variable clock to produce the clock signal. In another embodiment, an interpolated virtual clock may be used to produce the clock signal. One skilled in the art will recognize other devices that may be useful in the present invention.

In a further embodiment, the apparatus may be configured to include a counter for determining actuator position, a counter for determining velocity, a counter for detecting gaps, and a counter for servo band detection. In one embodiment, the counters may reach a fixed steady state value as determined by a reference signal.

A system of the present invention is also presented for the velocity proportional clocking of time base servo tape storage devices. In particular, the system, in one embodiment, includes: a tape drive and a controller for the tape drive, the controller including a clock varying module, a signal processing module, and a mechanical control module as described above.

The system may further include a computer in electronic communication with the tape drive.

A method of the present invention is also presented for the velocity proportional clocking of time base servo tape storage devices. The method in the disclosed embodiments substantially includes the steps necessary to carry out the functions presented above with respect to the operation of the described apparatus and system. In one embodiment, the method includes: receiving a velocity command and varying a clock signal frequency in response to the velocity command; producing a feedback control signal to control the velocity of a time base servo device in response to the clock signal frequency; and a mechanical control module configured to vary the velocity of a servo motor in response to the feedback control signal. The variations described above for the apparatus and system may also be applicable to the present method.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
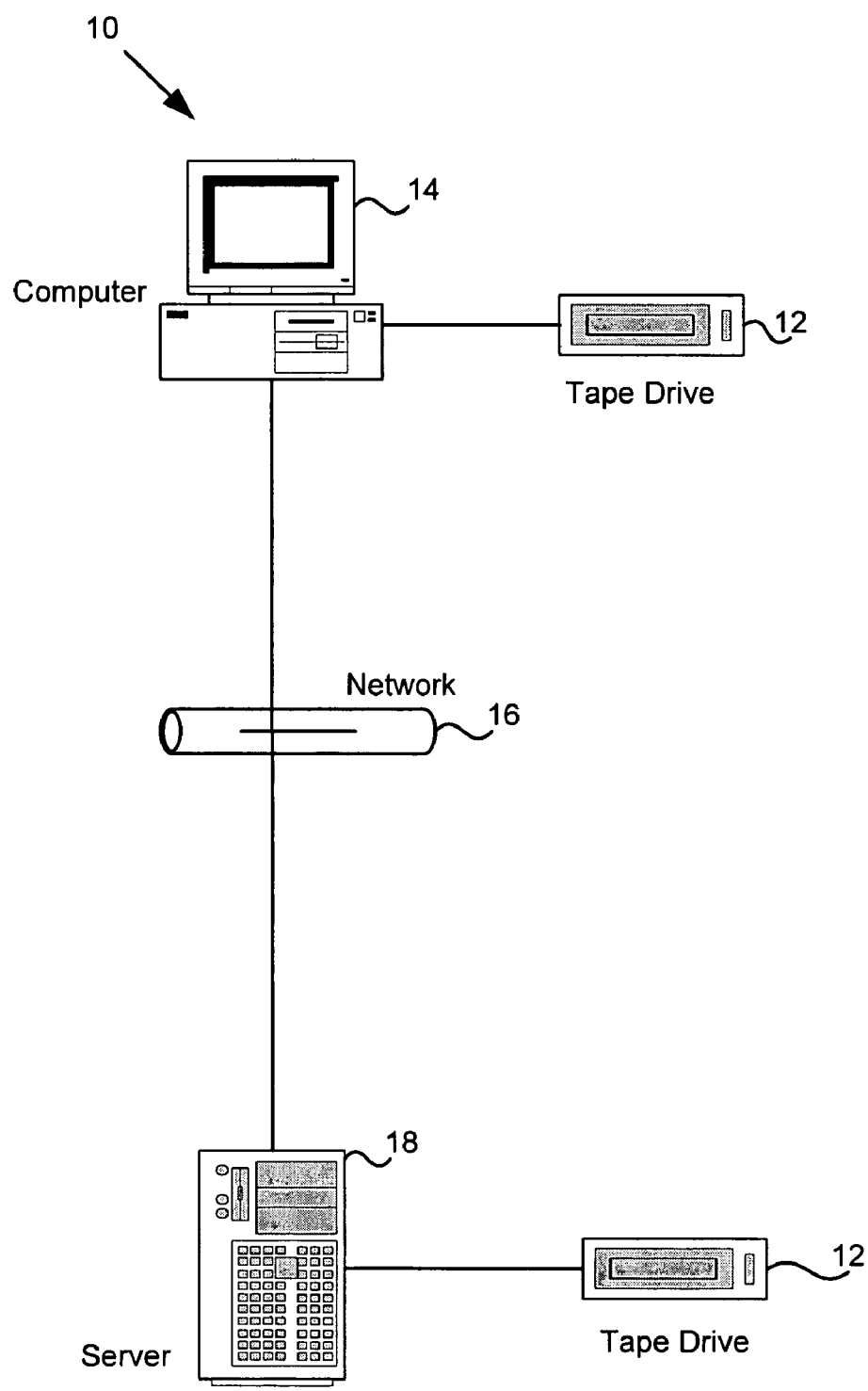
FIG. 1 is a schematic block diagram illustrating one embodiment of a system for the velocity proportional clocking of a time base servo tape storage device in accordance with the prior art.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device including an ASIC (Application-Specific Integrated Circuit) or FPGA (Field-Programmable Gate Array).

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts system 10 for the velocity proportional clocking of a time base servo tape storage device. System 10, as shown, includes tape drive 12 connected to computer 14. Computer 14 may also be in communication with tape drive 12 via network 16 where network 16 is connected to server 18, and server 18 is connected to tape drive 12. Computer 14 may alternatively be a workstation, personal computer, host server or other computing machine. One skilled in the art will recognize other storage area network, computer network, and internet configurations including other storage devices, computers, workstations, mainframe computers, personal computers, printers, and other peripherals that are relevant to system 10.

Figure 2:
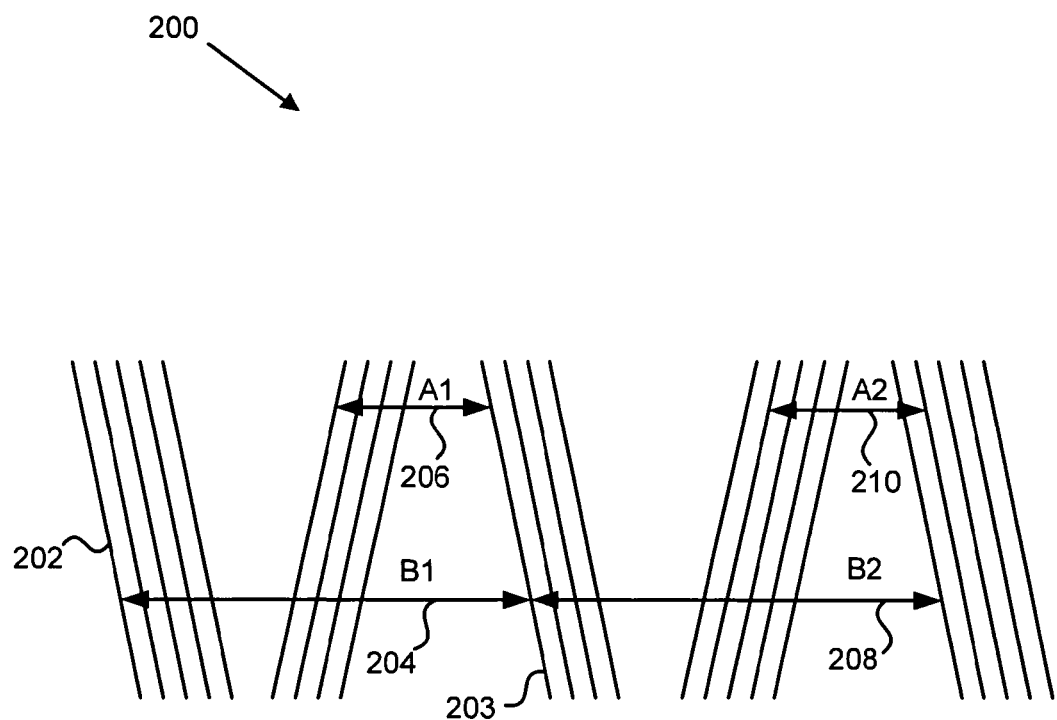
FIG. 2 is a schematic illustrating one embodiment of servo signal stripes stored on magnetic tape in accordance with the prior art.

FIG. 2 is a schematic illustrating one embodiment of servo signal stripes 200 as stored on magnetic tape in accordance with the prior art. In one embodiment, servo signal stripes 200 include signals 202 and 203 that are formatted onto magnetic tape in regular intervals at the time of manufacturing. The intervals are a fixed distance from one another and the distance between them is B1 204 as depicted. In one embodiment, time base servo controllers measure the time interval between repeating signals 202 and 203 to determine the current velocity of the tape. This data can then be used to adjust the tape velocity through a controller feedback loop. Measurement A1 206 is used for detecting the lateral movement of the tape head. Because A1 206 becomes smaller when the tape head moves in one direction and larger in the other direction, the lateral movement of the tape head can be calculated by figuring the ratio between A1 206 and B1 204. Then, the head position can be adjusted accordingly. This process may be continuously repeated in subsequent cycles by utilizing measurements B2 208 and A2 210 etc. to continually correct any errors in longitudinal or lateral head position. One skilled in the art will recognize other tape formats and servo stripe formats that are relevant to the present invention.

In one embodiment, the time interval between signal 202 and signal 203 is computed by counting the number of clock cycles that occur between those signals. When signal 202 is detected, a counter is activated and begins counting the clock cycles. Then, when signal 203 is detected, the counter is stopped and the resultant count may be used to calculate the velocity. In another embodiment, the time interval calculated may be the time between one or more signal peaks. For example, the counter might begin counting at signal 202 but keep counting until three more signal peaks are detected so the length of tape would be four times B1 204. The data collected by the counters can then be used to produce a feedback signal to correct any errors in head position.

In one embodiment, a fixed clock is used for measuring the time between signal peaks, which may cause the count to become very large at slow velocities (resulting in overflow) and very small at high velocity (resulting in a lack of resolution). Additionally, a fixed clock may cause problems when sampling the signal as well. If the velocity is low, a fixed clock will provide a large number of samples per cycle, and if the velocity is high the result will be a small number of samples per cycle. These problems can result in high costs because of the design requirements and inefficiencies as will be recognized by one skilled in the art.

Figure 3:
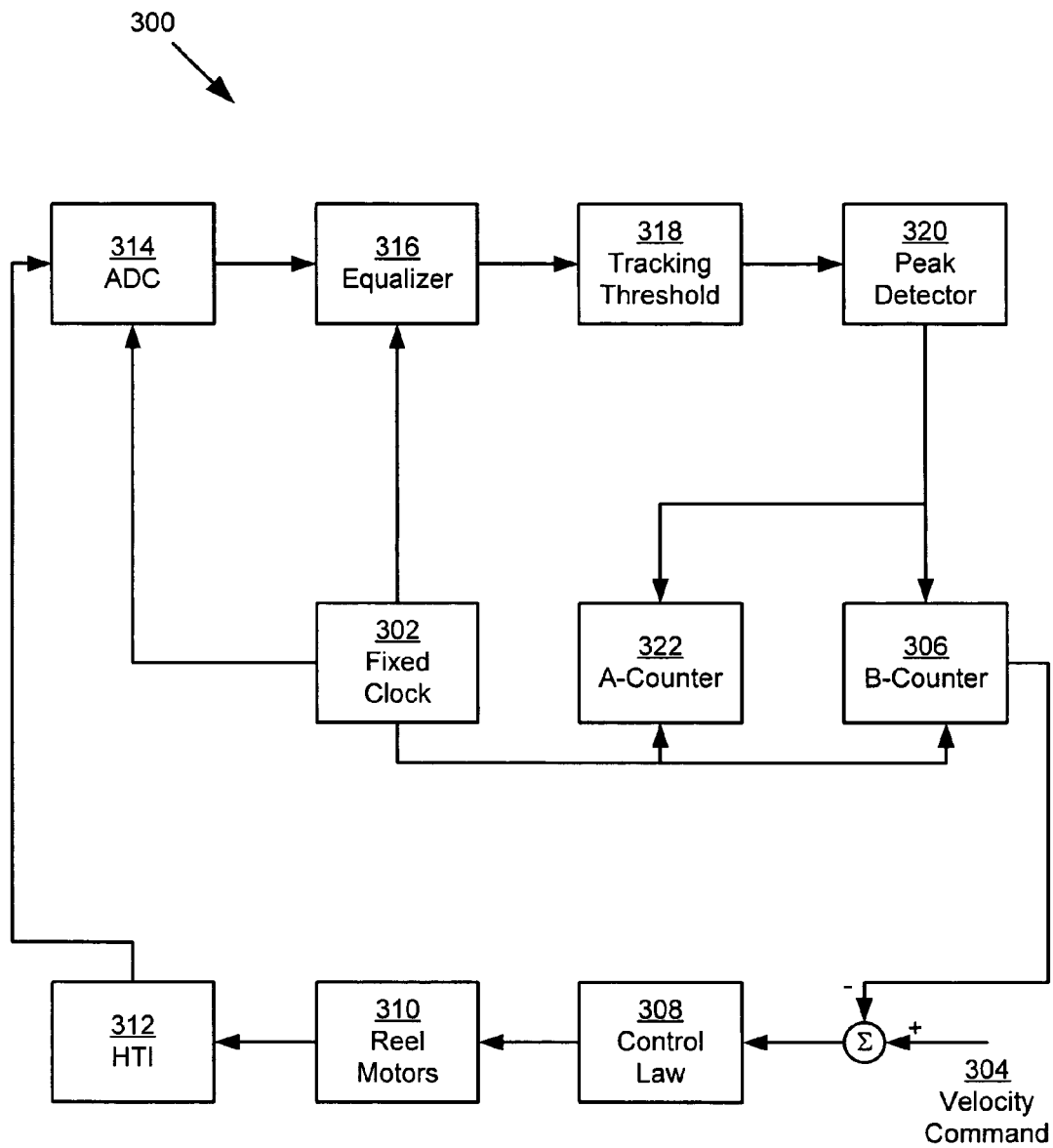
FIG. 3 is a schematic block diagram illustrating one embodiment of an apparatus for controlling a time base servo tape storage device in accordance with the prior art.

FIG. 3 is a schematic block diagram illustrating one embodiment of apparatus 300 for controlling a time base servo tape storage device in accordance with the prior art. Apparatus 300 may utilize fixed clock 302 to provide a clock signal to the various modules in the device. Velocity command 304 is provided to the apparatus as a means to set the desired velocity. B-Counter 306 provides a feedback control signal that is summed with velocity command 304 to determine if the current operating velocity is equal to the desired operating velocity. In one embodiment, if the current velocity is too fast, a positive error value will be fed to control law 308, and if the velocity is too slow, a negative error value will be fed to control law 308. In response, control law 308 will either increase or decrease the speed of reel motors 310 to match the desired velocity.

In one embodiment, HTI (Head-to-Tape Interface) 312 continuously monitors servo signal stripes 200 stored on the magnetic tape. The signal stored on the tape is sampled by ADC (Analog-to-Digital Converter) 314 at the frequency determined by fixed clock 302. The samples are sent to equalizer 316 for processing. Because the clock is running at a fixed frequency, the number of samples per clock cycle will vary with tape velocity. This requires settings for equalizer 316 to be designed for each different operating velocity. Additionally, equalizer 316 utilizes a combination of signal filters to overcome potential problems resulting from tape signal dropout due to media defects. In one embodiment, these filters are implemented digitally as IIR (Infinite Impulse Response) or FIR (Finite Impulse Response) filters, and the filter coefficients must be designed and switched in for each different operating velocity. In other embodiments, different types of filters or methods for correcting signal errors may be used as will be recognized by one skilled in the art.

In one embodiment, tracking threshold 318 receives the processed signal from the equalizer and ensures that the apparatus is operating within required limits. In one embodiment, peak detector 320 detects signal 202 as depicted in FIG. 2. Once signal 202 is detected, B-counter 306 will increment with each clock cycle until peak detector 320 detects the next signal peak 203. At this point, the counters will stop counting and the value in B-counter 306 may be used to produce the feedback control signal to be summed with velocity command 304. Likewise, A-counter 322 increments with each clock cycle to measure the time corresponding to distance A1 206, and the measurement may be used to correct lateral head movement. The process may be repeated until a steady state is reached which will occur when B-counter 306 equals velocity command 304. In one embodiment, the feedback control signal is adjusted according to the PAT (Peak Arrival Time). The PAT, in one embodiment, may be produced by interpolating the three least significant bits of the feedback control signal. This allows for a more precise indication of where the signal peak is as will be recognized by one skilled in the art.

Figure 4:
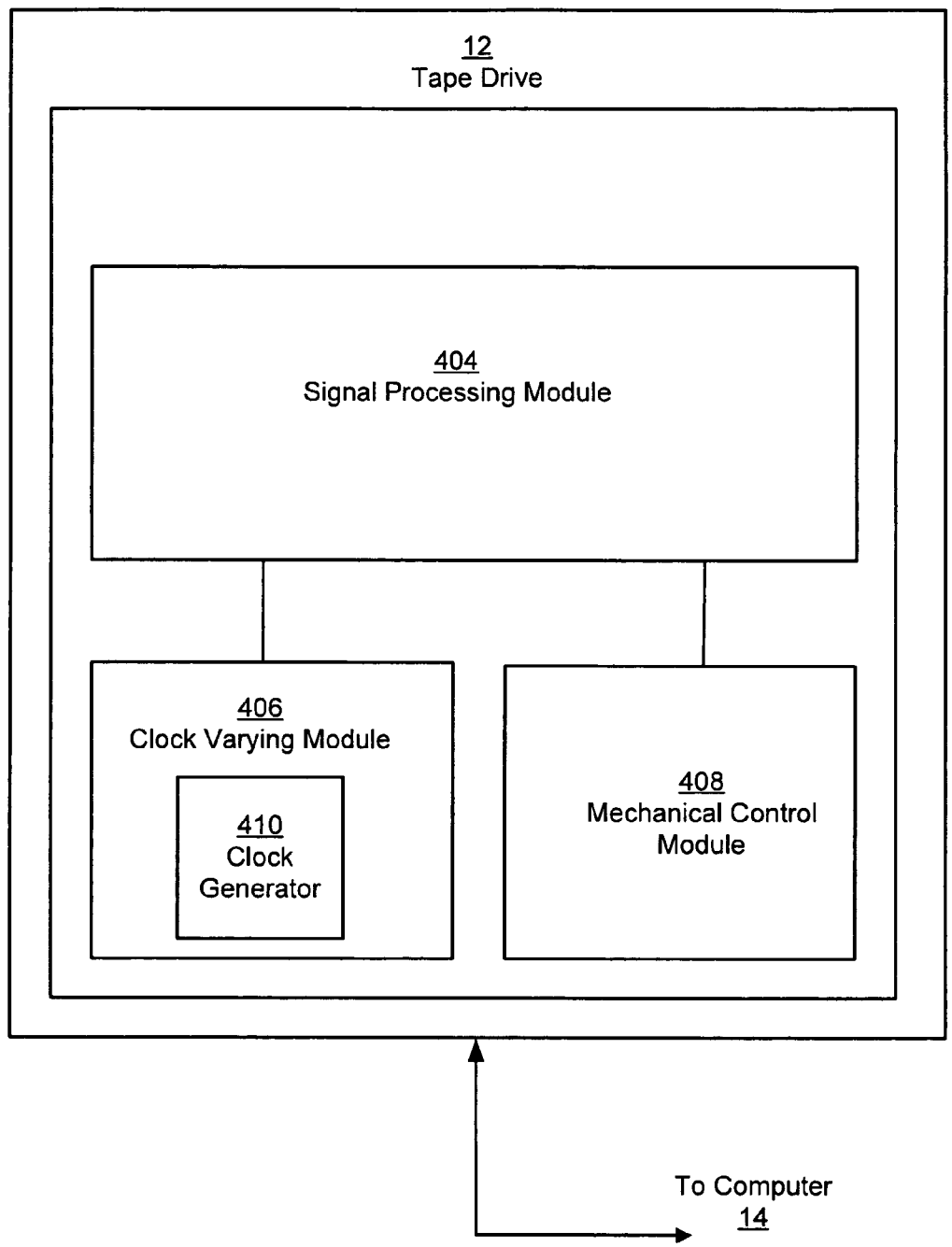
FIG. 4 is a schematic block diagram illustrating one embodiment of a tape drive in accordance with the present invention.

FIG. 4 is a schematic block diagram illustrating one embodiment of tape drive 12 in accordance with the present invention that overcomes the problems and limitations of the prior art. Tape drive 12 may be connected to computer 14 and may contain controller 402 for controlling the tape drive's operations. In another embodiment, controller 402 may be contained in computer 14, server 18, or any other processing device as will be recognized by one skilled in the art. Controller 402 includes signal processing module 404, clock varying module 406, and mechanical control module 408.

In one embodiment, clock varying module 406 is configured to receive a velocity command and vary a clock signal frequency in response to the velocity command. Clock varying module 406 may also include clock generator 410 which can be a PLL (Phase Locked Loop) variable clock, interpolated digital clock, or other clocking device as will be recognized by one skilled in the art. Clock generator 410 produces a clock signal and varies its frequency according to the velocity command.

In one embodiment, signal processing module 404 is connected to clock varying module 406 and mechanical control module 408. Signal processing module 404 may be configured to produce a feedback control signal in response to the clock frequency generated by clock varying module 406. In one embodiment, the feedback control signal allows a servo motor velocity to change in proportion to the clock frequency. For example, to reduce the servo motor velocity by half, the clock frequency must also be reduced by half, and the feedback control signal is used to communicate the change in clock frequency to the servos.

In one embodiment, signal processing module 404 sends the feedback control signal to mechanical control module 408. The signal is then used to adjust the velocity of the servo motors as indicated by the feedback control signal. Mechanical control module 408 may also be configured to read the signal stored on the magnetic tape and send the signal back to signal processing module 404 for processing.

Figure 5:
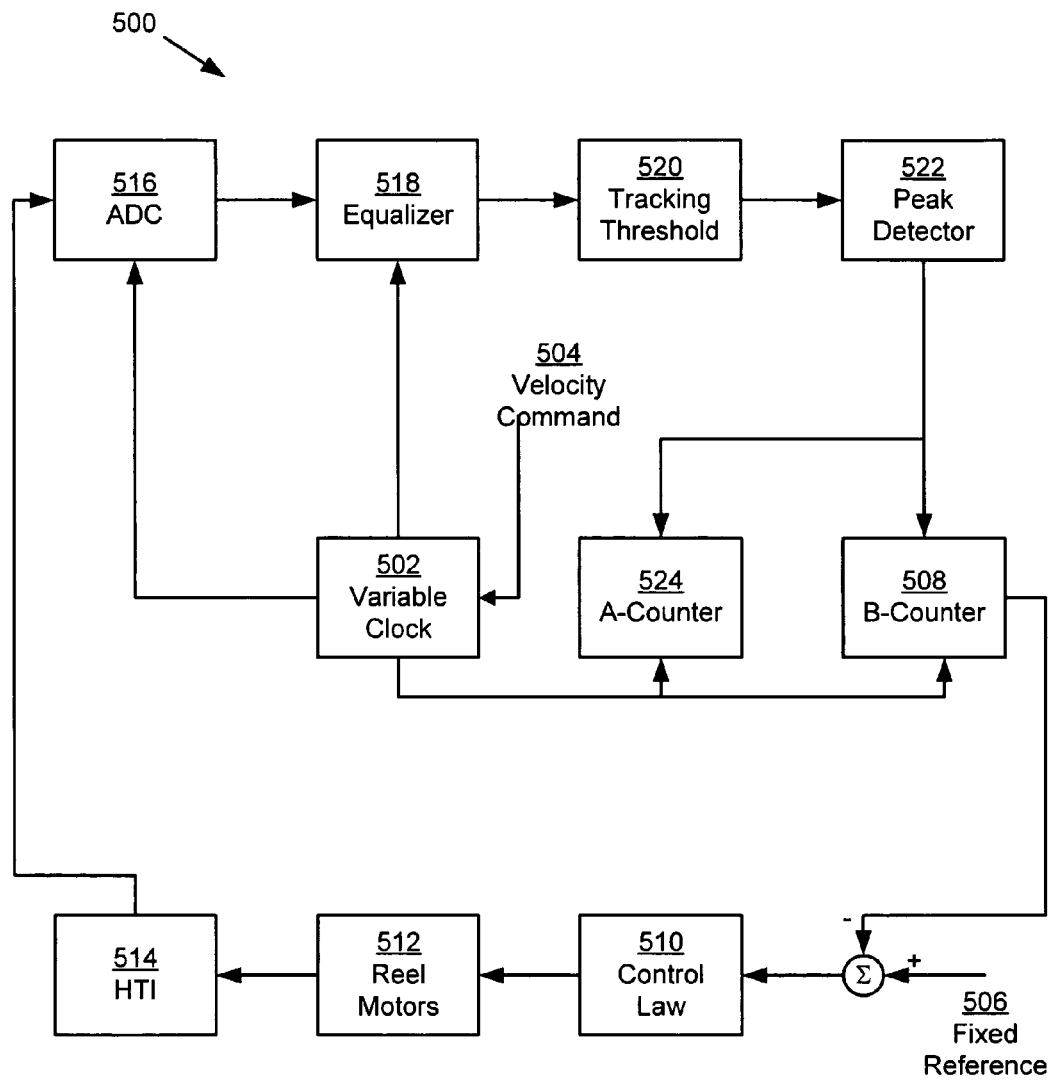
FIG. 5 is a schematic block diagram illustrating one embodiment of an apparatus for the velocity proportional clocking of a time base servo tape storage device in accordance with the present invention.

FIG. 5 is a schematic block diagram illustrating one embodiment of apparatus 500 for controlling a time base servo tape storage device in accordance with the present invention. Apparatus 500 is similar to apparatus 300 except that the tape velocity is controlled using velocity proportional clocking instead of direct velocity command 304. In order to accomplish velocity proportional clocking, variable clock 502 may receive velocity command 504 and adjust the clock frequency accordingly. In order to calculate the proper clock frequency, fixed reference 506 is set at a value that can be increased or decreased to prevent overflow or resolution problems with B-counter 508. For example, in one embodiment, if fixed reference 506 is set at 6000, then when a steady state is reached, the value in B-counter 508 will also be equal to 6000. Therefore, if B-counter 508 is experiencing overflow errors, fixed reference 506 can be lowered from 6000 to 3000. Then, the value in B-counter at steady state will also become 3000 thereby reducing the risk of overflow. In order to keep the servo motors running at the same velocity, however, the clock frequency may also need to be adjusted when fixed reference 506 is changed.

Once an appropriate value for fixed reference 506 is established, the clock frequency and thus, the velocity, can be varied by adjusting variable clock 502. For example, if the current operating velocity is 4 m/s, and the clock signal frequency is 7.5 Mhz, the velocity can be reduced to 2 m/s by setting the clock frequency to 3.75 Mhz. In one embodiment, the velocity varies directly proportional to the clock frequency, but other relationships may also be implemented as will be recognized by one skilled in the art.

In one embodiment, fixed reference 506 is summed with the feedback control signal from B-counter 508, and the resulting difference is sent to control law 510. If necessary, control law 510 adjusts the velocity of reel motors 512, and HTI (Head-to-Tape Interface) 514 continues to read the magnetic tape signal. Like apparatus 300, the signal is sampled by ADC (Analog-to-Digital Converter) 516; however, because variable clock 502 is used instead of fixed clock 302, the number of samples per cycle remains constant regardless of velocity. Subsequently, when the sampled signal is passed on to equalizer 518, noise can be filtered out using the same settings for each operating velocity. The result is a more efficient and less costly design.

In one embodiment, the signal is passed to tracking threshold 520 to ensure that the apparatus is operating within the tracking limits. Then, peak detector 522 detects signal 202 as described above, causing B-counter 508 to begin counting clock cycles. A-counter A1 524 operates in a similar manner as depicted in FIG. 2. Once signal 203 is detected, the counters stop counting and the value stored in B-counter 508 may be used to produce the feedback control signal which may then be summed with fixed reference 506. In one embodiment, the process may be repeated until a steady state is reached. In further embodiments, the apparatus may include counters for velocity feedback, counters for detecting gaps, and counters for servo band detection as will be recognized by one skilled in the art.

Figure 6:
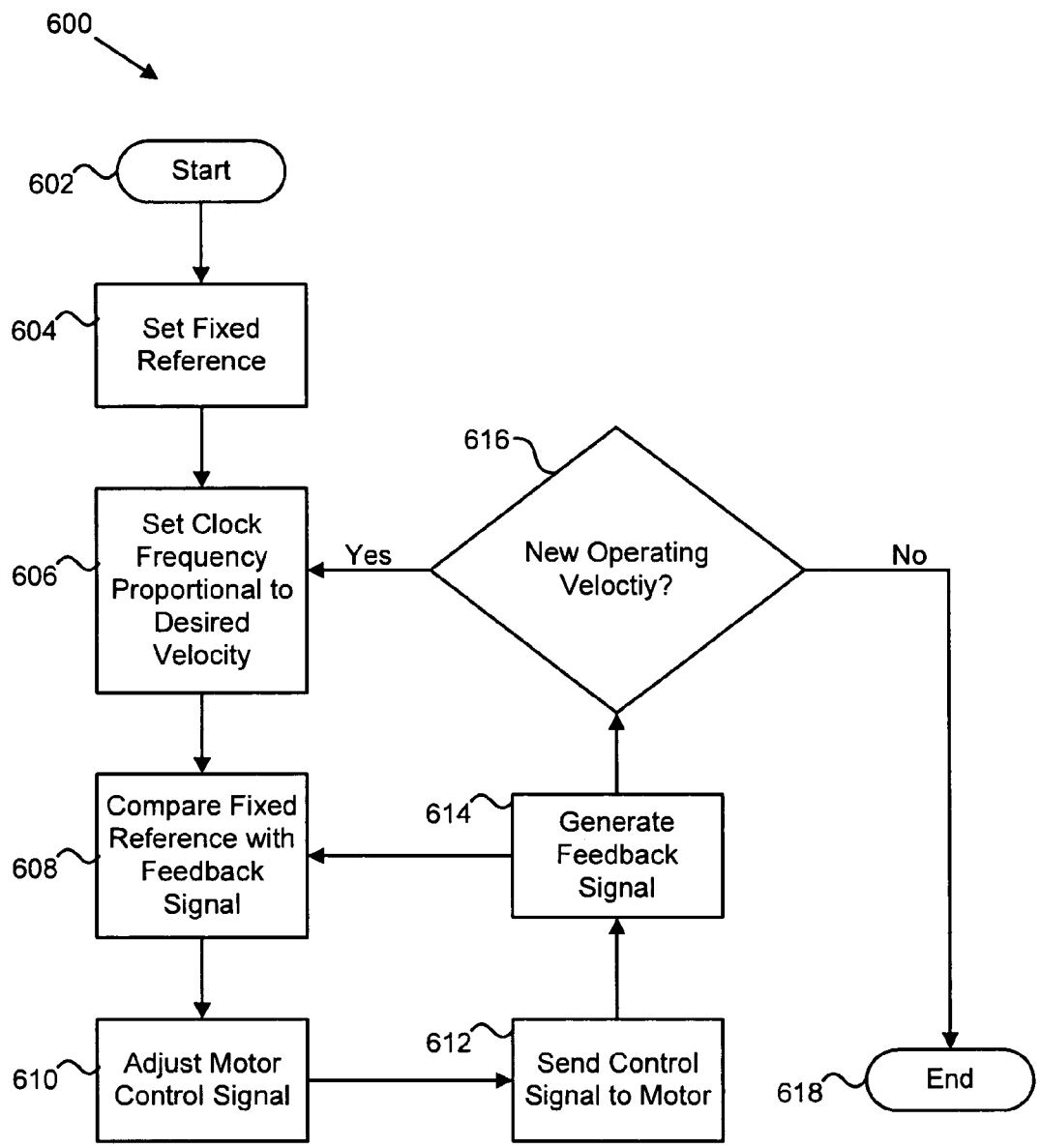
FIG. 6 is a schematic flow chart diagram illustrating one embodiment of a method for the velocity proportional clocking of a time base servo tape storage device in accordance with the present invention.

FIG. 6 is a schematic flow chart illustrating one embodiment of method 600 for the velocity proportional clocking of a time base servo tape storage device in accordance with the present invention. Method 600 may be conducted using the system and apparatus described above or may be conducted independent thereof. In one embodiment, method 600 starts 602 and a fixed reference is set 604. The fixed reference value is set to avoid overflow and resolution problems with the feedback signal as discussed above. Once the reference value is set, the clock frequency can be set 606 relative to the fixed reference so the system operates at a desired velocity. In one embodiment, the relationship between the clock frequency and the fixed reference is determined by the equation: Fixed Reference=(B distance/velocity) *#stripes*PAT*clock, where B distance is the length of tape, velocity is the speed of the tape, #stripes is the number of servo stripes on the tape, PAT is the peak arrival time, and clock is the clock frequency.

In one embodiment, the fixed reference is compared with a feedback signal 608 to determine if the system is operating at the desired velocity. When the proper velocity is reached, the feedback signal will be equal to the fixed reference and the servo motors will continue to operate at the same speed. However, if there is a difference between the feedback signal and the fixed reference, the motor control signal may be adjusted 610 to correct the error. The motor control signal may then be sent to the motors 612 causing them to operate at the adjusted speed.

In one embodiment, a servo tape signal is stored on magnetic tape and the distance between signals is used to determine the current velocity of the tape as depicted in FIG. 2. A counter may be used to measure the amount of time that passes between signals, as described above, and that information may then be used to generate the feedback signal which is again compared to the fixed reference 608.

If a change in velocity is required 616, the clock frequency may be adjusted. In one embodiment, the change in frequency is proportional to the operating velocity. Therefore, to reduce the velocity by half, the clock frequency should also be reduced by half. If a change in velocity is not required 616, the method ends 618, and the loop 608–614 may continue to cycle in order to maintain the steady state velocity of the device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for controlling a time base servo tape storage device, the apparatus comprising:
    a clock varying module configured to receive a velocity command and vary a clock signal frequency in response to the velocity command;
    a signal processing module configured to produce a feedback control signal to control the velocity of a time base servo device in response to the clock signal frequency; and
    a mechanical control module configured to vary the velocity of a servo motor in response to the feedback control signal.

2. The apparatus of claim 1, wherein the feedback control signal causes the servo motor operating velocity to vary directly proportional to the clock signal frequency.

3. The apparatus of claim 1, wherein the current operating velocity is detected and utilized to produce the feedback control signal.

4. The apparatus of claim 1, wherein the servo motor actuates a time base linear tape storage device.

5. The apparatus of claim 1, wherein the servo motor actuates a time base helical tape storage device.

6. The apparatus of claim 1, wherein a PLL (Phase Locked Loop) variable clock is utilized to produce the clock signal.

7. The apparatus of claim 1, wherein a digital virtual clock is utilized to produce the clock signal.

8. The apparatus of claim 1, further comprising a counter for determining actuator position, a counter for determining velocity, a counter for detecting gaps, and a counter for servo band detection.

9. The apparatus of claim 8, wherein the steady-state values for the counters are a fixed number determined by a reference signal.

10. A signal bearing medium tangibly embodying a program of machine-readable instructions executable by a digital processing apparatus to perform operations for controlling a time base servo tape storage device, the operations comprising:
    receiving a velocity command and varying a clock signal frequency in response to the velocity command;
    producing a feedback control signal to control the velocity of a time base servo device in response to the clock signal frequency; and
    varying the velocity of a servo motor in response to the feedback control signal.

11. The signal bearing medium of claim 10, wherein the feedback control signal causes the servo motor operating velocity to vary directly proportional to the clock signal frequency.

12. The signal bearing medium of claim 10, wherein the current operating velocity is detected and utilized to produce the feedback control signal.

13. The signal bearing medium of claim 10, wherein the servo motor actuates a time base linear tape storage device.

14. The signal bearing medium of claim 10, wherein the servo motor actuates a time base helical tape storage device.

15. The signal bearing medium of claim 10, wherein a PLL (Phase Locked Loop) variable clock is utilized to produce the clock signal.

16. The signal bearing medium of claim 10, wherein a digital virtual clock is utilized to produce the clock signal.

17. The signal bearing medium of claim 10, further comprising a counter for determining actuator position, a counter for determining velocity, a counter for detecting gaps, and a counter for servo band detection.

18. The signal bearing medium of claim 17, wherein the steady-state value for the counters are a fixed number determined by a reference signal.

19. A system to control a time base servo tape storage device, the system comprising:
    a tape drive; and
    a controller for controlling the tape drive, the controller comprising:
        a clock varying module configured to receive a velocity command and vary a clock signal frequency in response to the velocity command;
        a signal processing module configured to produce a feedback control signal to control the velocity of a time base servo device in response to the clock signal frequency; and
        a mechanical control module configured to vary the velocity of a servo motor in response to the feedback control signal.

20. The system of claim 19, further comprising a computer in electronic communication with the tape drive.

* * * * *